(12) United States Patent
Chao (10) Patent No.: US 10,730,795 B2
(45) Date of Patent: Aug. 4, 2020

(54) AQUEOUS FOAM CARRIER AND METHOD OF MAKING THE SAME

(71) Applicant: Allied Foam Tech Corp., Montgomeryville, PA (US)

(72) Inventor: Yen-Yau Chao, Harleysville, PA (US)

(73) Assignee: ALLIED FOAM TECH CORP., Montgomeryville, PA (US)

( * ) Notice: Subject to any disclaimer, the term of this patent is extended or adjusted under 35 U.S.C. 154(b) by 162 days.

(21) Appl. No.: 15/979,191

(22) Filed: May 14, 2018

(65) Prior Publication Data

US 2018/0257986 A1   Sep. 13, 2018

Related U.S. Application Data

(63) Continuation-in-part of application No. 15/196,214, filed on Jun. 29, 2016, now Pat. No. 10,252,942.

(Continued)

(51) Int. Cl.

| | |
|---|---|
| *C04B 24/12* | (2006.01) |
| *C04B 16/08* | (2006.01) |
| *C04B 14/04* | (2006.01) |
| *C04B 28/14* | (2006.01) |
| *C04B 28/08* | (2006.01) |
| *C04B 28/02* | (2006.01) |
| *C04B 28/04* | (2006.01) |
| *C04B 103/44* | (2006.01) |
| *C04B 103/32* | (2006.01) |
| *C04B 103/30* | (2006.01) |

(Continued)

(52) U.S. Cl.
CPC .............. *C04B 24/12* (2013.01); *C04B 14/04* (2013.01); *C04B 16/08* (2013.01); *C04B 28/02* (2013.01); *C04B 28/04* (2013.01); *C04B 28/08* (2013.01); *C04B 28/14* (2013.01); *C04B 2103/10* (2013.01); *C04B 2103/20* (2013.01); *C04B 2103/302* (2013.01); *C04B 2103/32* (2013.01); *C04B 2103/44* (2013.01); *C04B 2103/48* (2013.01)

(58) Field of Classification Search
CPC ....... B32B 13/04; B32B 15/08; B32B 17/064; B32B 16/0641; B32B 16/0633; B32B 18/08; B32B 24/20; B32B 28/02; B32B 28/14; B32B 38/10; B32B 40/0039; B32B 40/0046
USPC ....... 501/95.2; 106/672, 680, 705, 709, 715, 106/735, 819–820; 428/613, 36.5
See application file for complete search history.

(56) References Cited

U.S. PATENT DOCUMENTS

| | | | | |
|---|---|---|---|---|
| 3,689,245 A | * | 9/1972 | Weidman ............... | A01N 25/16 504/243 |
| 4,200,413 A | * | 4/1980 | Fitch ..................... | B65G 53/30 406/46 |

(Continued)

FOREIGN PATENT DOCUMENTS

CN      10 3043963      *   4/2013   ............. C04B 28/04

*Primary Examiner* — Patricia L. Hailey
(74) *Attorney, Agent, or Firm* — STIP Law Group, LLC (57) ABSTRACT

A stable aqueous foam carrier. The stable aqueous foam carrier includes (1) a stable aqueous foam comprising a foam agent and a foam stabilizer; and (2) additives comprising fibers and other additives used in hydraulic compositions, wherein the additives are uniformly dispersed in the stable aqueous form carrier, wherein the stable aqueous foam carrier does not contain any of gypsum, cement, concrete, fine pozzolanic additives, and aggregates.

19 Claims, 4 Drawing Sheets

Related U.S. Application Data

(60) Provisional application No. 62/186,092, filed on Jun. 29, 2015.

(51) Int. Cl.
    *C04B 103/20*    (2006.01)
    *C04B 103/10*    (2006.01)
    *C04B 103/48*    (2006.01)

(56) References Cited

U.S. PATENT DOCUMENTS

| | | |
|---|---|---|
| 4,230,746 A | 10/1980 | Nahta |
| 4,347,145 A | 8/1982 | Gregorian et al. |
| 4,494,990 A | 1/1985 | Harris |
| 4,597,831 A | 7/1986 | Anderson |
| 4,661,159 A | 4/1987 | Ortege et al. |
| 5,696,174 A | 12/1997 | Chao et al. |
| 5,958,131 A | 9/1999 | Asbridge et al. |
| 6,197,107 B1 | 3/2001 | Stav et al. |
| 6,241,815 B1 | 6/2001 | Bonen |
| 7,732,032 B2 | 6/2010 | Dubey |
| 8,070,876 B1 * | 12/2011 | Jiang .................. C04B 20/1033 106/638 |
| 10,252,942 B2 * | 4/2019 | Chao ....................... B32B 13/04 |
| 2016/0264839 A1 * | 9/2016 | Mata ....................... C04B 28/04 |

\* cited by examiner

AQUEOUS FOAM CARRIER AND METHOD OF MAKING THE SAME

CROSS REFERENCE TO RELATED APPLICATIONS

This application is a continuation-in-part application (CIP) of U.S. application Ser. No. 15/196,214, filed on Jun. 29, 2016, which claims the benefit of Provisional U.S. Patent Application No. 62/186,092, filed on Jun. 29, 2015. The entire disclosures of all these applications are hereby incorporated by reference.

BACKGROUND OF THE INVENTION

The last century has seen great advances in the formulation aids and additives for cement, concrete and gypsum compositions. Such organic, inorganic, polymeric, and fibrous additives significantly broadened the scope of slurry preparation, speed of production, options in material processing and handling, and diversified means in precast and cast-in-place applications.

Advances in enhanced performance after curing covers early and final mechanical properties, speed of setting, water and chemical resistance, crack resistance, durability, and many other properties. However, one can still identify many areas where conventional technologies and processes are still used extensively today, yet lack the efficiency and capabilities to match the fast pace and new development in hydraulic materials, property enhancement additives, processes, energy requirements, desired specific performance, and cost parameters.

Even with the advancement in water reducing plasticizers, superplasticizers, polymeric binders, man-made mineral composites and fillers, as well as other setting and accelerating additives, ordinary Portland cement that consumes very high energy to produce and generates great amount of $CO_2$ in the manufacturing process is still being used as the major hydraulically settable material for the building and construction industries. It is also well known that cementitious slurries typically need hours to set and days to produce adequate strengths for handling and use. Furthermore, for applications such as producing backer boards, blocks, panels, foundations, bridges, and roads that require proper strength development, surface finish, and absence of extensive shrinkage and cracking, proper curing conditions may often involve energy or labor-intensive and time-consuming steps.

On the other hand, hydraulic materials such as calcined gypsum, plaster of Paris, or stucco composites can set and develop strength quickly after adding water. Unlike Portland cement, the hardened gypsum products are often without shrinkage and produce good surface finish. Producing calcined gypsum (Calcium sulfate hemihydrate) from the gypsum mineral (Calcium sulfate dihydrate) requires much lower energy than that used in producing cement powder. However, in making gypsum slurries, a great amount of processing water is used (80-90% by weight of gypsum powder), and most of the water has to be evaporated in the drying process. The higher water solubility of hydrated gypsum products than that of hydrated cement makes most of these gypsum products unsuitable for exterior applications.

Numerous efforts were made to combine calcined gypsum with cement to achieve early strength development, great surface finish, and low shrinkage. However, most of such efforts failed—some catastrophically. Major causes of such failures are now well recognized as coming from the uncontrollable macrocrack formation when the hardened products were later exposed to temperature and humidity elements. Such late stage macrocrack formations are believed by many to have originated from the large ettringite crystals formed within the microvoids or microcracks that were present in the original hardened composites. Such secondary or delayed ettringite crystal formation—$3CaO.Al_2O_3.(CaO.SO_3)_3.32H_2O$ (DEF) is mostly derived from the interaction of some of the key components of cement (such as the tricalcium aluminate—$3CaO.Al_2O_3$) and the soluble gypsum species. After hardening and upon exposure to the environmental elements, the gypsum component, due to its higher solubility, may continue to react with tricalcium aluminate ($3CaO.Al_2O_3$) in the composite to form large crystals of ettringite ($3CaO.Al_2O_3.(CaO.SO_3)_3.32H_2O$) and cause expansion and the associated macrocracking within the voids and crevices in the hardened composite.

$$3CaO.Al2O3+3(CaSO4.2H2O)+26H2O=3CaO.Al_2O_3.(CaO.SO_3)_3.32H_2O$$

To reduce DEF formation of such gypsum rich cement composites, U.S. Pat. Nos. 4,494,990, 4,661,159, and 5,958,131 describe the use of additives to react with the gypsum species. However, these prior art examples also recognize that such additives can only be effective in a very narrow range of weight percentages in a gypsum-cement mixture without causing significant adverse effects on the product. Moreover, the amount of gypsum used in the mixture is usually between 30 to 80% by weight, which is far greater than that typically used in a Portland cement formulation (4-6%). Prior inventions fail to clearly address the continuous and possible product deterioration upon long term humidity or water exposure at various elevated temperatures with the presence of such great amounts of the gypsum species (30-80%). The weight associated with the use of high amount of aggregates in the prior inventions also made the product much heavier than their cementitious or gypsum counterparts that were already being used in the industry. U.S. Pat. No. 6,197,107 addresses the post hardening expansion and macrocrack formation by DEF, but the invention is effective only in a very narrow range of the ratios among calcined gypsum, cement, and additives. The product was found to deteriorate rapidly and eventually totally disintegrate when the ratios fall outside of the narrow window. Such composition constraints need of excessive aggregates, and need of elaborate curing process are the reasons why using such additives was generally unsuccessful.

Anionic, cationic, zwitterionic or hydrolyzed protein based foam agents commonly used in making lightweight cement or gypsum products are known for their limited foam stability. Typically, the foam will start to show volume shrinkage or foam collapse as soon as they were made. The volume shrinkage or foam collapse of a freshly made foam is typically caused by the transformation of the lightweight foam back into its un-foamed liquid state.

Foam collapse typically comes from coarsening of the foam bubbles through the coalescing of small bubbles into larger ones. The large bubbles will burst easily and go back to their liquid state because of the fast liquid drainage from the bubble walls. The thinning or the liquid drainage of walls quickly destabilizes the bubbles and causes them to burst. Many attempts have been made to increase the foam stability and reduce liquid drainage. One such attempt is the use of an anionic foam stabilizer to stabilize a cationic foam (U.S. Pat. No. 5,696,174).

To reach a stable aqueous foam, U.S. Pat. No. 5,696,174 employs a two component approach using a foaming agent stabilized with a foam stabilizer. This is similar to the two components epoxy-amine system or the two component isocyanate-polyol system. However, unlike the latter two that use crosslinking chemistry to permanently lock the two components together, these two components turn the foam back to the initial un-foamed liquid state after most of the foam liquid is drained off from the foam surface and causes foam collapse.

Most of the prior arts dealing with foam stability in making lightweight cement or gypsum articles are focused on the efficiency of such foams in reducing the weight of the hydraulic article, being low cost and complying with the minimum compressive strength required before significant foam collapse takes place. In such industrial applications, very little information is available on the study of pore fineness, the means to prevent the foam structure from coarsening, and the benefit and justification of maintaining the stability of a fine-pored foam towards making of the foamed hydraulic articles. No prior art was found on how a very light and stable aqueous foam can be used as a dispersing media or carrier for fibrous, organic, inorganic, and polymeric additives used in a hydraulic slurry.

The present invention provides solutions to many of the problems set forth above. Additionally, the present invention provides a foam carrier that may carry accelerators, retarders, wax, polymer binder, and fiber or some other very reactive components for a typical slurry. Using such a foam carrier, a slurry itself may contain only water, water reducer, and hydraulic powder. This approach has the advantage of opening up all kinds of process possibilities and flexibilities, such as avoiding plant mixer downtime for making fast setting composites and making hydraulic articles with targeted performance features, which would be otherwise unattainable if such components are directly mixed into slurries.

SUMMARY OF THE INVENTION

It is an objective of the present invention to provide a water based foam carrier that contains additives and with no liquid drainage or foam collapse during application. The additives may be fibers, water reducing plasticizers and superplasticizers, polymer, starch, accelerators, retarders, wax or silicon water resistant additives, colorant, lightweight fillers, or others for hydraulically settable slurries such as cement, concrete and gypsum.

It is also an objective of the present invention to provide a gypsum slurry with a stable and water based foam carrier that contains additives such as wax, accelerators, retarders, and uniformly dispersed fibers.

It is also an objective of the present invention to provide a cementitious slurry with a stable and water based foam carrier that contains additives such as fiber, polymer, accelerators, retarders, lightweight fillers, water reducing additives and other ingredients.

It is also an objective of the present invention to provide a gypsum rich cement and pozzolanic additives mix with a stable and water based foam carrier that contains additives such as fiber, polymer, accelerators, retarders, lightweight fillers, water reducing additives and other ingredients.

It is also an objective of the present invention to provide a cementitious composition with a foamed aqueous carrier containing uniformly dispersed fine denier (as low as 0.5 dpf) to higher denier polyvinyl alcohol, cellulose or similar hydrophilic and hydrophobic organic fibers at amounts from 0.5% to 50% by weight of foam.

It is also an objective of the present invention to provide a fiber-containing foam carrier and process that can allow incorporation of fine denier fibers uniformly into hydraulic slurries in as short as less than 1 minute of mixing time.

It is also an objective of the present invention to provide a fiber-containing stable aqueous foam additive for use in the various fast setting gypsum rich cement, and pozzolanic additive mixes with or without aggregates.

It is also an objective of the present invention to provide a process to uniformly disperse high amount of hydrophilic or hydrophobic fibers in a stable aqueous foam without using excess amount of water as fiber dispersant.

It is also an objective of the present invention to provide a high fiber-containing foam that is very useful as an effective weight reduction additive, rheology modifier, slump controller, crack resistance additive, and tensile strength improver for various hydraulic cementitious, gypsum or gypsum rich cement and pozzolanic additives mixes.

It is also an objective of the present invention to provide lightweight fiber-containing cementitious products without using excess amount of formulation water during manufacturing, and with lightweight, high tensile and bending strengths, and without any shrinkage cracking upon aging in moist environment.

It is also an objective of the present invention to develop a low dpf PVA fiber-containing aqueous stable foam with foam stability far exceeding that of the original stable foam without the fiber.

It is also an objective of the present invention to develop a high fiber-containing foam that is very useful as an effective rheology modifier to a hydraulically settable slurry with very low slump for cast without slurry running offline and multi-panels stacking without deformation.

It is also an objective of the present invention to provide a continuous production process for making lightweight and high fiber containing hydraulically settable products through a continuous mixing of a preformed fiber containing foam and a hydraulic slurry. Both the fiber containing preformed foam and the hydraulic slurry may, in turn, be prepared separately through a continuous grout mixer or a static mixer. The two streams, one with fiber-containing foam and the other with the hydraulic slurry, can then be mixed or pumped onto a production line or moving belt where panels, backer boards, blocks or cast stones are continuously being produced.

It is yet another objective of the present invention to develop the various lightweight gypsum and cementitious products and composites such as ceiling panels and wall boards using a fiber containing foam that can allow high amount of fiber to be incorporated into the hydraulic products without using excess amount of formulation water.

It is also an objective of the present invention to provide a foamed fast setting, crack resistant and water resistant hydraulic product comprising PVA and other hydrophilic fibers, calcined gypsum, cement, and fine pozzolanic additives.

It is yet another objective of the present invention to provide a lightweight high gypsum containing cement and pozzolanic additive mixes with or without aggregates in making fast setting, quick demolding, crack free, high mechanical strengths and water resistant backer boards, panels, floor and roof panels, underlayment, decorative stones and blocks.

In one embodiment, a stable aqueous foam carrier comprises: (1) a stable aqueous foam comprising a foam agent and a foam stabilizer; and (2) additives comprising fibers, wherein the fibers are uniformly dispersed in the stable aqueous form carrier, wherein the stable aqueous foam carrier does not contain any of gypsum, cement, concrete, pozzolanic additives, and aggregates. The fibers may be mixed with the stable aqueous foam at a mixing speed from 50 to 500 rpm such that the shear from the mixing do not break foams in the stable aqueous foam. The stable aqueous foam carrier may be used for a hydraulically settable composition, a cementitious article, or a gypsum article. The additives may further comprise lightweight fillers, cement or gypsum accelerators, retarders, water proofing additives, water reducing plasticizers, superplasticizers, polymers, colorant, organic and fine inorganic fillers, thickeners or rheology modifiers, or a combination thereof.

The stable aqueous foam carrier may be configured to remain without any of foam collapse, foam bubbles coarsening, and liquid drainage for 0.1-1 hour so that the stable aqueous foam carrier is mixed thoroughly with a hydraulic slurry.

The foam agent may be a long-chain organic cation-forming compound, and the foam stabilizer may be a long-chain anion forming compound. The foam agent and the foaming stabilizer may be present in the stable aqueous foam carrier at a weight ratio of from 0.05:1 to 15:1. The stable aqueous foam may be configured to maintain the stability thereof without foam collapse in the event that other additives are added thereto.

The fibers may be hydrophilic fibers, hydrophobic fibers, or a mixture thereof. The fibers may be hydrophilic organic fibers. The fibers may be from 0.5 to 50% by weight of the stable aqueous foam. The fibers may have dpf values from 0.5 to 250, preferably from 0.5 to 25, and more preferably from 0.5 to 10.

In one embodiment, a hydraulically settable composition comprises: (1) a stable aqueous foam carrier and (2) a hydraulic mixture comprising gypsum, cement, concrete, fine pozzolanic additives, aggregates, or a mixture thereof. The hydraulic mixture may comprise gypsum, cement, and fine pozzolanic additives. The cement may be Portland cement Types I-V, aluminum cement, slag cement, or fast setting cement. The hydraulic mixture may comprise calcined gypsum, stucco, alpha-calcium sulfate hemihydrate, beta-calcium sulfate hemihydrate, or a mixture thereof.

The hydraulic mixture may comprise fine pozzolanic additives made of metakaolin, silica fume, fly ash, ground furnace slag, or a mixture thereof. The hydraulic mixture may comprise cement, gypsum, and pozzolanic additives with weight percentages of 20-80% of gypsum, 5-50% of cement, and 5-40% of pozzolanic additives, based on the hydraulic mixture.

The hydraulically settable composition may be configured to set in minutes for quick demolding, to develop high early and final compressive and tensile strengths, and to have water resistance, lightweight, and good surface finish without crack formation upon long term exposure to humid conditions. The hydraulically settable composition may have a density no larger than 10 pcf.

In one embodiment, a cementitious article may be formed from the hydraulically settable composition, wherein the cementitious article is one of a block, a wall and floor panel, a siding, a backer board, a roof deck, a roof tile, a decorative stone, a ceiling tile, a roof shingle and flooring, and a floor underlayment.

In one embodiment, a cementitious article may be formed from the hydraulically settable composition, wherein the cementitious article is a cement backer board comprising a foamed fiber cementitious core, wherein the foamed fiber cementitious core is sandwiched between (1) a first fiberglass mat or a fiberglass scrim and (2) a second fiberglass mat or a fiberglass scrim.

In one embodiment, a cementitious article may be formed from the hydraulically settable composition, wherein the cementitious article is a crack resistant and water-resistant building material for roads, foundations, or bridges, wherein the hydraulic mixture comprises cement, fly ash, sand, and aggregate.

In one embodiment, a gypsum article may be formed from the hydraulically settable composition, wherein the gypsum article is a ceiling tile or a wall board.

In one embodiment, a gypsum-rich cement composite comprises: (1) a stable aqueous foam carrier and (2) a hydraulic mixture comprising gypsum, cement, and pozzolanic additives, wherein the gypsum-rich cement is suitable for the making of block, wall and floor panel, backer board, siding, roof deck, roof tile, decorative stone, ceiling tile, roof shingle, flooring or floor underlayment, building, patching or repairing material for roads, foundations, or bridges.

In one embodiment, a process for forming a hydraulically settable composition comprises: (a) preparing an aqueous hydraulic slurry comprising one or more of gypsum, cement, pozzolanic additives, and aggregates; (b) adding a stable aqueous foam comprising a foam agent and a foam stabilizer on a top of the aqueous hydraulic slurry; and (c) adding 0.5-35% fibers by weight based on the aqueous hydraulic slurry on a top of the stable aqueous foam while the aqueous stable foam is mixed into the aqueous hydraulic slurry. The fibers may be premixed with the stabilized foam and then add the fiber containing stable foam into the aqueous slurry. The fibers may be mixed into the stable aqueous foam at a rotation speed of less than 500 rotations per minute. The combined volume of the stable aqueous foam and the fibers may be 5-95% of the volume of the aqueous hydraulic slurry.

The embodiments and the compositions disclosed in the present invention are not necessarily mutually exclusive to each other and may be used together.

BRIEF DESCRIPTION OF THE DRAWINGS

1.0 dpf and 25 mm in length polypropylene fibers mixed with foam AFT-425A/AFT-425B at 180 rpm mixing speed with a flat mixing paddle using a KitchenAid mixer.

DETAILED DESCRIPTION OF THE INVENTION

The stable aqueous foam carrier of the present invention comprises a stable aqueous foam and additives comprising fibers. The additives may further comprise polymers, water reducing plasticizers and superplasticizers, starch, accelerators, retarders, wax or silicon water resistant additives, colorant, or others typically used in hydraulically settable slurries. The fibers are uniformly incorporated into the stable foam, maintaining or enhancing the stability of the foam. Higher mixing efficiency mixing devices such as ribbon mixer, twin paddle mixer, and wire whisk or equivalent are needed to achieve the uniform fiber distribution when lower speed mixing is applied.

A suitable stable foam comprises a (1) cationic foam agent and (2) an anionic foam stabilizer. The cationic foam agent (1) is a long-chain organic cation-forming compound having Formula (I):

(I)

wherein R is an aliphatic hydrocarbon radical having from 8 to 24 carbon atoms; $R_1$ is selected form the group consisting of an alkyl group having 1-16 carbon atoms, a hydroxyalkyl group having 1-16 carbon atoms, a benzyl group, a group which, when taken together with the nitrogen, represents a heterocyclic radical, and any of such groups having a hydrogen atom replaced by a fluorine atom; $R_2$ and $R_3$ are selected form the group consisting of an alkyl group having 1-6 carbon atoms, a hydroxyalkyl group having 1-6 carbon atoms, a benzyl group, a hydrogen atom, a group which, when taken together with the nitrogen, represents a heterocyclic radical, and any of such groups having a hydrogen atom replaced by a fluorine atom; and X− is an anionic counter ion.

The anionic foam stabilizer (2) is a long-chain anionic foam stabilizer having Formula (II):

(II)

wherein R' is an aliphatic hydrocarbon radical with 10 to 24 carbon atoms; $X_2-$ is an anionic group selected from the group consisting of carboxylate, sulfate, sulfonate, and phosphate; and $Y^+$ is a cationic counter ion selected from the group consisting of ammonium, sodium, and potassium salt. The long-chain organic cation formed from (I) and the long-chain organic anion formed from (II) may be present in a weight ratio of from 0.05:1 to 15:1.

In one embodiment, the present invention produces large quantities such as several cubic feet or several cubic yards of the stable foam. A 2-4% aqueous dilution of the foam agent, with or without added fillers such as clay or thickeners, is fed into a two pumps foam generator such as Allied Foam Tech's AFT-G6. Compressed air, for example, at 80 psi is also fed into the generator through an electronically controlled solenoid valve. The preformed foam is then stabilized inside the foam generator using the foam stabilizer that is fed through a second pump. After further homogenization through a plurality of mixing chambers within the foam generator, a stable aqueous foam is produced without any liquid drainage nor foam collapse for minutes to hours. The preformed foam is then pumped into a cement mortar mixer with mixing paddles. Additives may then be mixed into the stable foam with the foam stability unchanged or enhanced and without any foam collapse during the whole mixing process.

A foamed cementitious slurry, gypsum slurry or a cement, calcined gypsum, and fine pozzolanic additive mixture of the present invention may be initiated by adding a fiber-containing preformed foam into a mortar mixer containing polymer dispersion, accelerators, retarders, wax, water reducer, and lightweight fillers to produce an extremely stable and non-running foamed aqueous foam carrier with very uniform additives distribution. The additive-loaded stable foam carrier may then be mixed with the hydraulic slurry of interest.

A foamed fiber and other additives-containing hydraulic slurry may be made by: (1) adding a fiber-containing stable foam carrier into a hydraulic slurry with other non-fiber additives; or (2) adding fibers on top of a stable foam carrier while the foam is being mixed with an aqueous hydraulic slurry. The process (2), which mixes fibers with a stable foam carrier before significant amount of hydraulic slurry is incorporated into the foam, can provide a simple manufacturing process without preparing a separate fiber-containing foamed stream beforehand. Both processes (1) and (2) may provide very good filament dispersion for fine denier hydrophilic fibers such as PVA. To uniformly incorporate large amounts (>5% by weight on the hydraulic powder) of low dpf PVA fibers into a hydraulic slurry, the process (1) that premixes the high amount of low dpf PVA fibers with the stable foam before adding it to the hydraulic slurry is preferable.

The hydraulic cement used in the current invention may be Type I-V Portland cement, slag cement, calcium sulfoaluminate cement, expansive cement, or rapid set cement.

The calcium sulfate hemihydrate or gypsum used in the present invention may be calcined gypsum, stucco, alpha-, beta-calcium sulfate hemihydrate, or a combination thereof.

The fine pozzolanic additives used in the present invention to prevent the formation of DEF (delayed ettringite formation) may be manmade or nature products. Manmade fine pozzolanic additive may be metakaolin, silica fume, ground blast furnace slag, or fly ash, and more preferably metakaolin.

When adding fibers into the stable foam, the fibers may be added in the amount of 0.5-50% by weight of the foam. Hydrophilic and hydrophobic fibers with very different fineness, as expressed by dpf (denier per filament) or decitex (dtex), may be easily and uniformly distributed in the lightweight foam stream. The dpf numbers of the fibers suitable for the present invention may have a range of 0.5-100, preferably 0.5-25, and more preferably 0.5-10. Fibers such as PVA, nylon, polypropylene, basalt, rayon, and acrylic are suitable for such purposes, and PVA fibers with low dpf are most preferred for such cementitious slurries that require low fiber consumption, high tensile strength, and crack resistance.

If polymers are used in the foamed composition of the present invention for better water resistance or better adhesion, it may comprise water-soluble or water-dispersable polymers and may be present up to 30% by weight of the foam carrier, or the polymeric additives may be incorporated directly into the hydraulic slurry. The foamed aqueous composition including polymers may be prepared by any known polymerization technique, such as, for example, suspension, emulsion dispersion, or solution polymerization. The polymers present in the foamed aqueous composition may be dispersions of polyurethane, poly-acrylic copolymers, ethylenevinylacetate copolymers, synthetic and natural rubber emulsions, polyisocyanate dispersions, and/or aqueous urea formaldehyde solutions.

The stable foam carrier of the present invention may optionally contain the various fillers such as clay, limestone powder, lightweight fillers, or aggregates. Lightweight fillers may be perlite, expanded polystyrene beads, and other fillers known to the industry. The use of low dpf hydrophilic fibers-containing foam carrier may function as a lightweight thickener, rheology modifier, or thixotropic additive that may render the hydraulic slurries with desirable slump loss and rheological characteristics for the various manufacturing processes such as quick demolding, and wet cast on various sheet-like coating substrates with controlled degree of wetting, slurry penetration and thickness build-up without running on a production line.

Water reducing additives used in the hydraulic slurries that are fully compatible with the foam carrier of the present invention may be conventional plasticizers or superplasticizers of sulfonates or carboxylates. The sulfonate plasticizers can be a sulfonate-containing plasticizer such as lignosulfonates, or superplasticizer such as polynaphthalene sulfonate condensate (PNS) used in the industry having a typical weight average molecular weight of from about 8,000 to about 14,000. Naphthalenesulfonate superplasticizers include the alkali salt of polynaphthalenesulfonic acid and its alkali salts, the condensation products of naphthalenesulfonic acids and formaldehyde. Particularly desirable polynaphthalenesulfonates include sodium and calcium naphthalenesulfonate. Such commercial products include Diloflo, GEO Specialty Chemicals, Cleveland, Ohio; Daxad, Hampshire Chemical Corp., Lexington, Mass.; and Lomar D, GEO Specialty Chemicals, Lafayette, Ind. Such superplasticizers are also called fluidizers or dispersants. They are preferably used as aqueous solutions. Alternatively, the naphthalenesulfonates may be used in dry solid or powder form, such as Lomar D from GEO Specialty Chemicals.

Gypsum accelerators may be used in the foam carrier of the present invention to shorten the setting time when they are added into gypsum or gypsum rich cementitious slurries. Some accelerators include finely ground dry calcium sulfate dihydrate, commonly referred to as "gypsum seeds or ground gypsum". They may also be used together with sugar or starch. The gypsum seeds enhance nucleation of the set gypsum crystals, thereby increasing the crystallization rate thereof. Potassium or ammonium sulfates may also be used as set accelerators.

Gypsum retarders may be used in the foam carrier of the present invention to extend the setting time when they are added into gypsum or gypsum rich cementitious slurries. Such retarders may be a chelating agent selected from at least one of sodium citrate, citric acid, tartaric acid, sodium tartrate, a sodium salt of polyacrylic acid, an acrylic acid sulfonic acid copolymer, an ammonium salt of an acrylic acid sulfonic acid copolymer, a sodium salt of an acrylic acid sulfonic acid copolymer, or a blend of an acrylic acid polymer with a sulfonic acid copolymer and salts thereof. Wax or silicon oil may also be used in the aqueous foam carrier of the present invention for improving water resistance of the hydraulic slurry.

EXAMPLES

Making of the fiber-containing foam carrier of the present invention in bench scale and in industrial scale are briefly described in Examples 1 and 2 respectively. Making hydraulically curable composites and scrim covered backer boards with the fiber-containing carrier are described in Examples 3 and 4, respectively. Example 5 describes a process of incorporating typical gypsum additives into an aqueous foam stream. Example 6 describes a process for making foamed gypsum with well controlled setting speed by incorporating gypsum accelerator in the foam stream and the gypsum retarder in the gypsum slurry.

Example 1. Bench Scale Preparation of Fiber-Containing Aqueous Foam

A stable aqueous foam is prepared with a two-part foam system with (1) foam agent AFT-425A from Allied Foam Tech., and (2) a foam stabilizer AFT-425B from Allied Foam Tech using a Hobart Kitchen Aid 10 speed blender with wire whisk. During the foam generation a 2-5 weight % foam agent aqueous solution is foamed at speed 8 (225 rpm) for a few minutes, then a 1-5 weight % foam stabilizer is added into the mixing bowl. After foaming further for a minute or so, a stable aqueous foam at a density of 0.03-0.08 g./cc and without any foam collapse nor liquid drainage for minutes is achieved. Incorporating fine filler additives in the foam agent and polymeric additives in the foam stabilizer may extend the foam stability.

PVA fibers of different dpfs (1-200) may be blended into the stabilized foam by either manually using a mixing blade or continuing the use of wire whisk at speed 4 (135 rpm) or a flat beater at speed 6 (180 rpm) to mix the specified amount of fibers into the preformed foam. Higher mixing speeds may shorten the time to achieve a totally dispersed fiber filament within the foam composite. Hand mixing may result in a small portion of fibers, especially finer denier ones, not completely dispersed. The resulting fiber-containing foam is firm and stable with uniform fiber filament distribution without any fiber lump nor fiber ball formation.

Although this Example uses AFT-425A from Allied Foam Tech as a foam agent and AFT-425B from Allied Foam Tech as a foam stabilizer, any combination of the foam agents of Formula (I) and the foam stabilizers of Formula (II) described above may be used.

Example 2. Industrial Scale Preparation of Fiber-Containing Aqueous Foam

A stable aqueous foam is prepared with Allied Foam Tech's AFT G-6 foam generator and the two-part foam: (1) a foam agent and (2) a foam stabilizer.

For the foam agent, a 2-5% foam agent AFT-425A mixed with 15% by weight kaolin clay is fed into the generator with a positive displacement pump. An 80-90 psi at >10 SCFM supply of compressed air is fed into the foam generator at the air-liquid mixing chamber.

The foam stabilizer consisting of 1-5% foam stabilizer AFT-425B is fed into the foam through a second positive displacement pump. Four cubic feet of the stabilized foam thus made is fed into a 6 cubic feet capacity cement mortar mixer with mixing paddles, ribbon or twin ribbon mixing blades. A desired quantity of PVA or other fibers are added into the preformed foam in the mixer. Twin ribbon mixer at >50 rpm is preferred for low dpf fibers. The resulting foam is thick with complete fiber distribution without any fiber lump or fiber ball formation.

Although this Example uses AFT-425A from Allied Foam Tech as a foam agent and AFT-425B from Allied Foam Tech as a foam stabilizer, any combination of the foam agents of Formula (I) and the foam stabilizers of Formula (II) described above may be used.

Example 3. Preparation and Curing of Foamed Cementitious Composite from a Fiber-Containing Foam and a Hydraulic Slurry of Portland Cement Mix In a Kitchen Aid mixing bowl 10 grams of a high range water reducer powder such as Lomar D from Diamond Shamrock is added. It is then mixed with 280 grams of water. 1,000 grams of Portland cement Type I or Type I/II at speed 2 (95 rpm) or 4 (135 rpm). Fixed amount of fiber-containing foam prepared from EXAMPLE 1 may then be mixed with the slurry at speed 4 to reach the desired density. The foamed slurry may then be cast into a mold of interest for room temperature cure or for 30-60 deg. C. moisture cure in a sealed bag for 1 or more days. Moisture cured article may then be unsealed for further drying at room or elevated temperature before strength measurement.

Example 4. Making of Foamed Cement Backerboard

A 0.25-inch-thick cement backerboard is made by mixing (A) a fiber containing aqueous foam with 37 grams of acrylic polymer, 67 grams of pre-foamed aqueous foam, 7 grams of PVA fibers, and 3 grams of polypropylene fibers and (B) a hydraulic slurry with 50 grams of water, 130 grams of Portland cement Type I, 200 grams of fly ash F and 3 grams of Lomar D superplasticizer. An alkali resistant fiberglass scrim is laminated to the top and bottom of the 0.25-inch low slump foamed slurry without the need of a mold. The room temperature dried piece has a modulus of rupture greater than 1,000 psi and an indented compressive strength of greater than 1,000 psi.

Example 5. A Process for Incorporating Gypsum Additives in a Preformed Foam

An aqueous foam is prepared according to EXAMPLE 1 using a stainless steel bowl and KitchenAid mixer. 30 grams of the stable preformed foam thus made is transferred to a second bowl under low mixing speed (100 to 200 rpm). A suitable amount of gypsum additives such as PVA fiber, wax emulsion, gypsum retarder and gypsum accelerator are then added into the preformed foam. When a uniform mix is achieved, the foam mixture is then added under low speed mixing (100 rpm) into a stucco slurry. The foamed stucco slurry can then be cast into molds.

Example 6. A Process for Making Foamed Gypsum with Controlled Setting Speed by Incorporating Gypsum Accelerator in the Foam Stream and the Gypsum Retarder in the Gypsum Slurry An aqueous foam is prepared according to EXAMPLE 1 using a stainless steel bowl and KitchenAid mixer. 30 grams of the stable preformed foam thus made is transferred to a second bowl under low mixing speed (100 to 200 rpm). Suitable amount of gypsum additives such as polyvinyl alcohol fiber, wax emulsion, and gypsum accelerator are then added into the preformed foam. When a uniform mix is achieved, the foam mixture is then added under low speed mixing (100 rpm) into a stucco slurry that contains the proper amount of gypsum retarder. The foamed stucco slurry shows a wide window of controlled setting time through such separation of accelerator containing stream from retarder containing slurry.

In making foamed cement roof decks and void fills, two major classes of foam agents—the protein based and the surfactant based foam agents are commonly used with protein based foam offering slightly better foam stability. In making foamed gypsum boards, sulfonate-based aliphatic surfactants are used and the fast setting gypsum mixes allow such less stable foam agents to be used without serious drawbacks. However, none of these foam agents has the required foam stability to maintain foam firmness and the needed viscoelastic feature long enough (typically 1-10 minutes) to shear apart or effectively disperse all the additives of interest before foam collapse sets in. Comparative Sample 2 in Table I shows that, when a protein-based foam agent Isocem S/B-P with limited foam stability is used in dispersing the low denier (1.8 dpf) PVA fibers, the poor foam stability immediately after foam preparation and the fast loss of foam rigidity/integrity from the poor stability made them very ineffective in dispersing the low denier PVA fibers, which are tightly held together.

Figure 1:
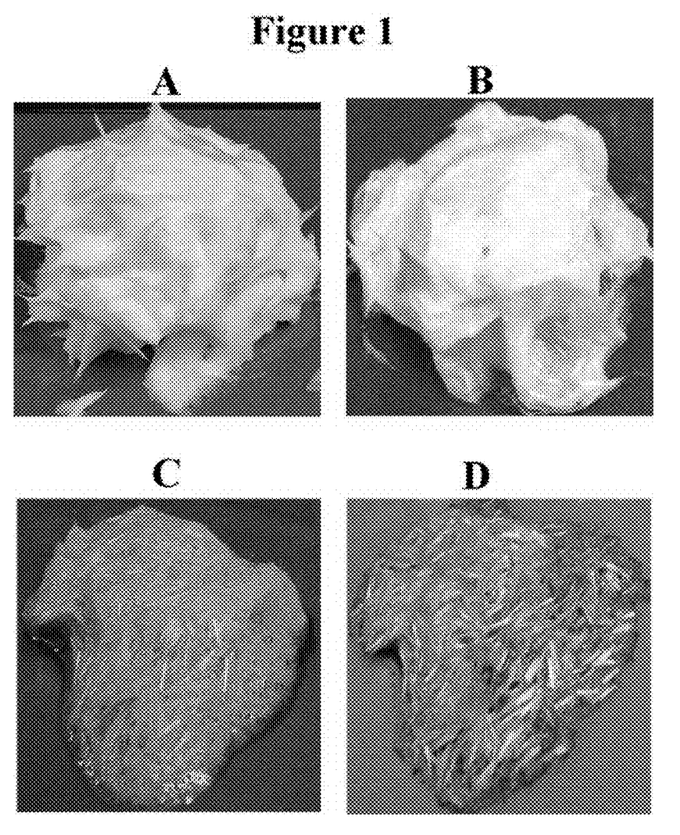
FIG. 1 shows images of: (A) a freshly prepared stable foam of the present invention with 9% by weight of PVA fiber with a dpf=1.8; (B) a totally dried stable foam with 9% by weight of PVA fiber with a dpf=1.8; (C) a freshly prepared foam from a protein with 9% by weight of PVA fiber with a dpf=1.8; and (D) a totally dried foam from a protein based foam with 9% by weight of PVA fiber with a dpf=1.8.

FIG. 1 shows that, after mixing of the PVA fibers with Isocem S/B-P (FIGS. 1C and 1D) within 1-2 minutes after the foam was formed, the fast drop in foam stability and the wateriness of the foam texture associated with such foam collapse made most of the PVA fibers remain in their original undispersed state after mixing. In contrast, the stable foam of the present invention, the AFT-425A foam agent/AFT-425B foam stabilizer (Sample 1 in Table 1) showed very effective filament dispersion of the PVA fibers during the whole mixing process with no drop in foam firmness, no detectable foam collapse, and no liquid drainage from foam. FIGS. 1A and 1B show that the whole texture and uniform fiber distribution in the AFT-425A/AFT-425B foam not only were unchanged during the whole mixing process, but also lasted until the foam became totally dry (FIG. 1B), which took more than 20 hours.

The poor fiber dispersion shown by the protein-based foam in Table 1 is quite surprising given that the foam was degraded by only 5% with some observable drop in foam viscosity as shown by the wateriness in 10 minutes after preparation (Comparative Sample 2 in Table 1). Evidently the effective dispersion of fine denier PVA fibers by foam during the mixing step relies very much on the foam firmness, viscosity or integrity. The fiber dispersing capacity can drop sharply when any of these required foam properties starts to degrade. The quick loss of such properties as exhibited by the low slump and wateriness of such foam agents shortly after preparation (FIG. 1C) make them indeed unsuitable for such task as also shown by the dried foam-fiber composite (FIG. 1D). In contrast, the stable foam in FIG. 1A and Sample 1 in Table 1 shows the required foam stability, firmness and shear stability during the whole process of mixing with the low denier PVA fibers. This makes it possible to produce highly uniform and effective fiber filament distribution in the hydraulic slurries. We further discovered that the stable fiber-foam composite of the present invention did not show any sign of foam collapse, fiber lump, or fiber ball formation through the whole drying process of the composite (FIG. 1B). Such further enhanced foam stability that is sustained for hours to days during the drying process could possibly be explained by some strong synergy between the stable foam and the fine denier PVA fibers in the foam.

Aqueous foams are dispersion of air in water. Foams are metastable and they may require the use of stabilizing agents to slow down the different mechanisms of foam ageing such as water drainage, inter-bubble coalescence, and foam coarsening. Water drainage eventually leads to foam coarsening followed by foam collapse. The present invention discovered that a thick and gel like liquid layer formed from the foam of the present invention, with its thick and viscous texture, greatly reduces water drainage and prevents foam collapse as shown in Sample 1 of TABLE 1. The present invention found that the viscous, lightweight, and stable foam of the present invention thus becomes very effective means to tear or disperse very fine denier fibers into filaments under shear by mixing. A conventional protein-based single component foam such as Isocem S/B-P has very watery liquid layers around the foam bubbles. The foam texture of the protein-based foam is non-viscous with fast liquid drainage. The foam is thus very ineffective in breaking up the fiber bundles into their individual filaments upon mixing (comparative Sample 2 in TABLE 1).

TABLE 1

Foam Stability Dependent Dispersion of Low dpf PVA Fibers

|  | Sample 1 | Sample 2 (comparative) |
|---|---|---|
| Fiber containing Preformed Foam: | | |
| Water | 100 grams | 100 grams |
| Foam agent | 5 grams AFT-425A[a] | 5 grams Isocem S/B-P[b] |
| Foam stabilizer | 5 grams AFT-425B[a] | None |
| 1.8 dpf PVA fiber | 9 grams | 9 grams |
| Foam Stability after Freshly Prepared: | | |
| Foam Collapse after 10 minutes | 0% (firm, viscous) | ~5% (very watery) |
| Water drainage of foam after 10 minutes (shown at the bottom of foam container) | none | yes (>40% by weight) |
| Foam Collapse after 60 minutes | 0% (firm texture) | >15% (very watery) |
| Undispersed PVA Fibers & Lumps | <5% undispersed | >90% undispersed |

[a]AFT-425A & AFT-425B are from Allied Foam Tech, US.
[b]Isocem S/B-P, a hydrolyzed protein foam product from Isotech, Italy.

TABLE 2

Enhanced Foam Stability by the Presence of Low dpf PVA Fibers

|  | Sample 1 | Sample 2 | Sample 3 (Comparative) |
|---|---|---|---|
| Foam formulation: | | | |
| Water | 100 grams | 100 grams | 100 grams |
| Foam agent | 5 grams AFT-425A | 5 grams AFT-425A | 5 grams AFT-425A |
| Foam stabilizer | 5 grams AFT-425B | 5 grams AFT-425B | 5 grams AFT-425B |
| 1.8 dpf PVA fiber | 16 grams | 8 grams | 0 |
| Foam Stability after Freshly Prepared: | | | |
| Foam/fiber collapse after 30 minutes | 0% | 0% | 0% |
| Foam/fiber collapse after 1 day | 0% | 0% | 20% |
| Foam/fiber collapse after 4 days (dry) | 5% | 8% | >80% |

In working with the various stable foam carriers, the present invention unexpectedly found that low dpf PVA fiber can extend the foam stability of the already stable two component AFT-425A/AFT-425B foam system. Sample 1 and Sample 2 of the present invention in Table 2 show that the fine denier (1.8 dpf) PVA fiber-containing AFT-425A/AFT-425B foams have no foam collapse 1 day after the foam preparation, while the comparative Sample 3 without fiber (Table 2) showed 20% foam collapse after 1 day aging. After 4 days aging, Sample 1 and Sample 2 foams (Table 2) only show less than 10% fiber/foam volume shrinkage while >80% of the foam was gone in the comparative Sample 3 without fiber (Table 2). Such extra foam stability (Samples 1 and 2 in Table 2) may have been derived from some strong synergistic interaction between the hydrophilic PVA fibers and the stable foam and is quite unexpected.

Table 3 shows that unexpectedly stable foam was derived from the AFT-425A/AFT-425B foam with the PVA fibers, and the PVA fibers made it possible to make a very low density, as low as below 5 pcf (80 kg/m³) foamed cement with maintained fine pore texture through the whole drying process. The inventor found no prior art that was able to make foamed cement at a density of equal to or less than 10 pcf (160 kg/m³) using conventional slurry process with Portland cement. Sample 1 in Table 3 was made with 10.8% of 1.8 dpf PVA fiber by weight based on the cement in the fiber-containing foam of the present invention. The foamed cement with fine pore size and at a dry density of 3.4 pcf (0.055 g/cc) was successfully made. The comparative Sample 2 in Table 3 using the protein based foam showed 100% foam cement collapse and most of the PVA fibers were in their undispersed fiber bundles.

TABLE 3

Performance of Foamed Cement with
Low Dpf PVA Fiber Containing Foam

|  | Sample 1 | Sample 2 (comparative) |
|---|---|---|
| Foam/fiber Mix: | | |
| Water | 100 grams | 100 grams |
| Foam agent | 5 grams AFT-425A[a] | 5 grams Isocem S/B-P[b] |
| Foam stabilizer | 5 grams AFT-425B[a] | None |
| 1.8 dpf PVA fiber | 9 grams | 9 grams |
| Foam/fiber mix added into cement Slurry: | 100 grams | 100 grams |
| Portland cement Type I | 50 grams | 50 grams |
| Water | 13 grams | 13 grams |
| Lomar D | 0.5 gram | 0.5 gram |
| Foamed Cement Behavior: | | |
| % by weight of 1.8 dpf PVA fiber on Cement powder | 5.4% | 5.4% |
| Fiber distribution | Uniformly dispersed | mostly undispersed |
| Foamed cement stability after preparation | 0% collapse | 100% collapse |
| Foamed cement dry density | 3.4 pcf (very fine pore texture) | 100% collapse |

[a]AFT-425A and AFT-425B are from Allied Foam Tech Corp.
[b]Isocem S/B-P protein foam agent from Isotech.

Figure 2:
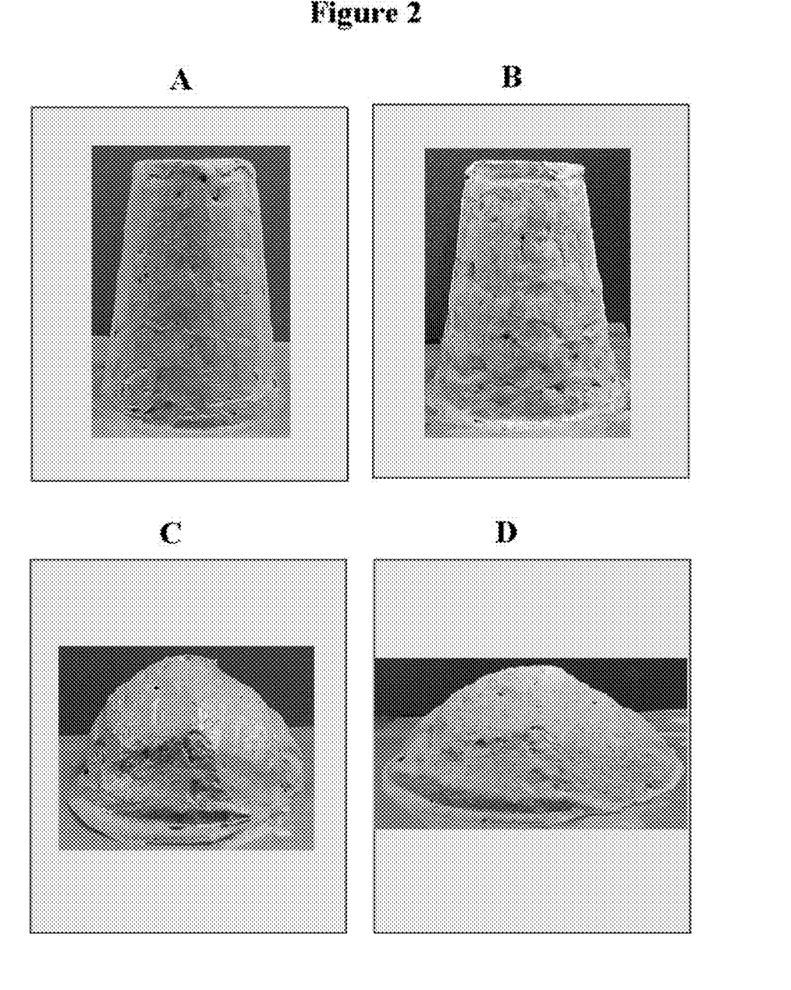
FIG. 2 shows images of: (A) a freshly cast slump cone of foamed cement (Sample 1 in Table 4) with 10% by weight of PVA fiber with a dpf=1.8; (B) a dried slump cone of foamed cement (Sample 1 in Table 4) with 10% by weight of PVA fiber with a dpf=1.8; (C) a freshly cast slump cone of foamed cement (Sample 2 in Table 4) without PVA fiber; and (D) a dried slump cone of foamed cement (Sample 2 in Table 4) without PVA fiber.

The inventor further discovered that the strong synergy between the fine denier PVA fibers and the stable foam could make the composition of the present invention as very effective rheology modifiers (Sample 1 in Table 4) and render a lightweight cementitious with very low slump (Samples 2A and 2B in FIG. 2), useful for multi-panels stacking during manufacturing. Such foam carrier without using additional amount of water other than what is in the foam already to disperse the fine denier fibers is very different from the >100 years old Hatschek process where over 20 folds of dispersing water (based on cement) is used to disperse fine denier cellulose fibers for making backer boards, sidings and roof tiles. Comparative Sample 2 (Table 4) without the PVA fibers showed very high slump, this is also shown in FIG. 2—Comparative Samples 3 and 4.

TABLE 4

Foamed Cement Slurry with Low Slump
Using PVA Fibers in a Stable Foam

|  | Sample 1 | Sample 2 (comparative) |
|---|---|---|
| Foam/fiber Mix: | | |
| Water | 100 grams | 100 grams |
| Foam agent | 5 grams AFT-425A | 5 grams AFT-425A |
| Foam stabilizer | 5 grams AFT-425B | 5 grams AFT-425B |
| 1.8 dpf PVA fiber | 12 grams | 0 |
| Foam/fiber mix added into cement Slurry: | 61 grams | 55 grams |
| Portland cement Type I | 60 grams | 60 grams |
| Water | 16 grams | 16 grams |
| Bentonite clay | 2.4 grams | 2.4 grams |
| Lomar D powder | 0.6 gram | 0.6 gram |
| Foamed Cement Behavior: | | |
| % by weight of 1.8 dpf PVA fiber on Cement powder | 10% | 0 |
| Fiber distribution | Uniformly dispersed | No fiber |
| Slump of cone made with freshly made slurry | Zero slump[a] | Slumped to 2/3 of the original cone height[a] |
| Slump of cone after drying | Zero slump | Slumped to 2/3th of the original cone height |

[a]Slump cone dimensions - cone height = 4.5", cone top diameter = 2½" and bottom diameter = 4½".

In dispersing low denier hydrophilic or hydrophobic fibers in the stable foam, the present invention discovered that mixing device and mixing speed are result effective variables in making very uniform fiber dispersion.

Figure 3:
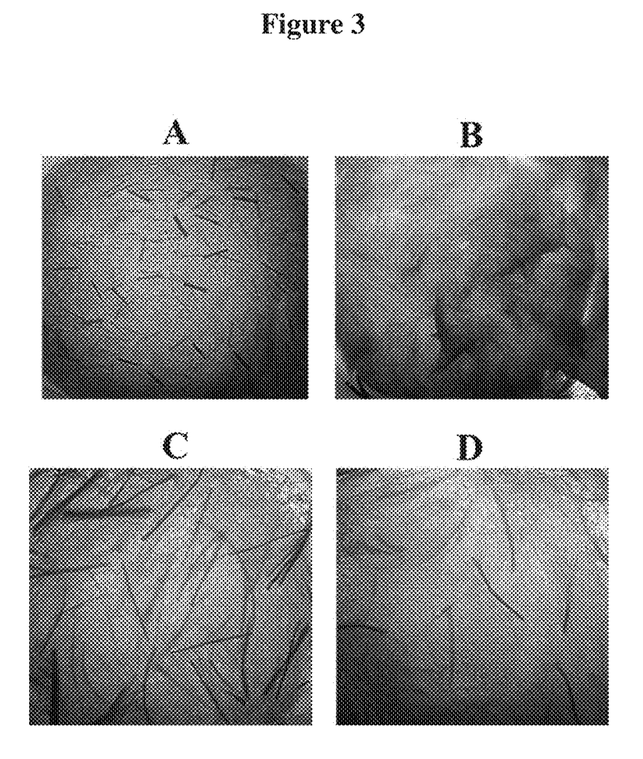
FIG. 3 shows images of: (A) 1.8 dpf and 6 mm in length PVA fibers mixed with foam AFT-425A/AFT-425B at 60 rpm mixing speed with a flat mixing paddle using a KitchenAid mixer; (B) 1.8 dpf and 6 mm in length PVA fibers mixed with foam AFT-425A/AFT-425B at 180 rpm mixing speed with a flat mixing paddle using a KitchenAid mixer; (C) 1.0 dpf and 25 mm in length polypropylene fibers mixed with foam AFT-425A/AFT-425B at 60 rpm mixing speed with a flat mixing paddle using a KitchenAid mixer; and (D)

FIG. 3 shows that the fiber uniformity of low dpf fibers in the stable foam of the present invention depends very much on the mixing speed when a KitchenAid mixer with a simple mixing blade attachment is used to disperse low denier hydrophilic PVA and hydrophobic pp fibers. At 60 rpm and mixed for 1 minute, both the 1.8 dpf PVA fibers (FIG. 3A) and the 1.0 dpf polypropylene fibers (FIG. 3C) show appreciable amount of undispersed fiber bundles in the foam matrix. As mixing speed increased to 150 rpm, fiber distribution for the PVA became very uniform (FIG. 3B) and the fiber distribution for the polypropylene fibers also showed significant reduction in undispersed fiber bundles (FIG. 3D).

Figure 4:
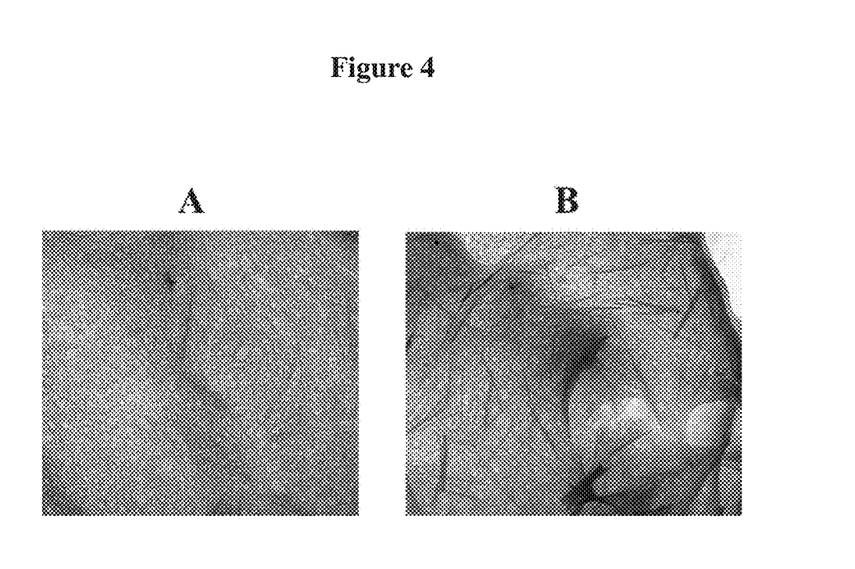
FIG. 4 shows images of (A) 1.8 dpf PVA fiber mixed with a stable foam at mixing speed 95 rpm with wire whisk for 0.5'; and (B) 1.8 dpf PVA fiber mixed with a stable foam at mixing speed 95 rpm with flat mixing paddle for 0.5'.

FIG. 4 shows that, when a more efficient mixing device such as a wire whisk instead of a flat mixing blade is used in a kitchenAid mixer, even at a mixing speed of 95 rpm and a 0.5 minute mixing time, the PVA fiber distribution in the stable foam is very uniform when the wire whisk was used (FIG. 4A), while undispersed PVA fiber bundles were still present in the foam when the flat mixing paddle was used at the same mixing speed and duration (FIG. 4B).

Other efficient mixing devices such as ribbon mixer, twin paddle mixer, and other similar devices may also be used for the fiber distribution of the present invention with better uniformity or shorter mixing time.

In making foamed gypsum or stucco articles such as wall boards or ceiling tiles, possibly due to the fast setting nature of gypsum, anionic surfactant based foaming agents such as Stepan AS-40 or Geo Specialties Hyonic PFM-10 with limited foam stability are commonly used. Comparative Sample 2 in Table 5 shows that, even using such fast setting gypsum mixes, a preformed foam of AS-40 showed significant foam collapse immediately after the foamed fiber mix was made. Most of the PVA fibers used in the foam were in their undispersed state during the whole mixing and setting process. In contrast, the foamed gypsum (Sample 1 in Table 5) using the stable foam carrier of the present invention containing all the uniformly distributed fibers, wax emulsion, gypsum accelerator and gypsum retarder did not show any foam collapse until the foamed gypsum was totally set. The foamed mix, with all the gypsum additives, produced a foamed gypsum slurry with all the desirable flow, hardness and weight reduction efficiency.

TABLE 5

Foamed Stucco with Preformed Foam Containing Fibers, Wax Emulsion, Gypsum Accelerator and Gypsum Retarder

|  | Sample 1 | Sample 2 (comparative) |
|---|---|---|
| Preformed Foam Composition: | | |
| Water | 100 grams | 100 grams |
| Foam agent | 5 grams AFT-425A | 5 grams AS-40[a] |
| Foam stabilizer | 5 grams AFT-425B | 0 |
| Gypsum Additives added to the Preformed Foam: | | |
| NYCON-PVA RECS15 fiber | 30 grams | 30 grams |
| Aqualite 81 wax emulsion | 60 grams | 60 grams |
| Versenex 80 gypsum retarder | 3 grams | 3 grams |
| Ground gypsum accelerator | 7 grams | 7 grams |
| Gypsum Slurry Composition: | | |
| Stucco powder | 400 grams | 400 grams |
| Water | 200 grams | 200 grams |
| Lomar D powder | 1.6 grams | 1.6 grams |
| Stability and Texture of the Preformed Foam: | Complete and uniform fiber distribution | Most of fibers undispersed |
| Stability and density of Foamed Stucco: | 0% collapse Density = 41 pcf (wet) | >50% collapsed Density > 80 pcf (wet) |

[a]Sulfonate foam agent from Stepan.

In making a fast setting gypsum rich cement with pozzolanic additives, the use of fine denier PVA fiber containing foams of the present invention (Sample 1 in Table 6) provided crack resistance upon humidity aging far superior than their counterparts with higher denier fibers (Sample 2 in Table 6) or without fiber (Comparative Sample 3 in Table 6).

In Table 6 all the 2"×2"×2" cubes of foamed gypsum-cement composites were exposed to accelerated heat and humidity aging at (1) 60° C. for 1 day in sealed bag, (2) followed by drying at 60° C. for 1 day, (3) submerged in 60° C. water for 1 day, and then (4) dried at 60° C. for 1 day. All the cubes were then examined for crack formation and the crack width was measured.

After the accelerated aging, the comparative Sample 3 (in Table 6) without fiber showed extensive cracks (2-3 inches long all around the 2"×2"×2" cube) and with different crack widths (15-40 microns). Sample 2 (in Table 6) with 1% by weight of 15 dpf PVA fibers showed hairline cracks with a crack width of 10-15 microns. The use of high denier PVA's did reduce the crack width and the total amount of cracks, but was ineffective to eliminate all the cracks. Sample 3 of Table 6 using 1% by weight of 1.8 dpf PVA fibers is totally crack free. This result clearly shows that, even at the same weight percent of fibers added, the fiber-containing foam of the present invention with finer dpf (=1.8) PVA (Sample 1) performed much better in crack prevention than the one with 15 dpf fiber (Sample 2) upon exposure to accelerated heat and humidity cycles.

TABLE 6

Crack Resistance of Gypsum Rich Cement-Metakaolin Composites Using Stable Foams with Low dpf PVA Fibers

|  | Sample 1 | Sample 2 | Sample 3 (Comparative) |
|---|---|---|---|
| Preformed foam: | | | |
| Water | 24 grams | 24 grams | 24 grams |
| Foam agent | 1.2 grams AFT-425A | 1.2 grams AFT-425A | 1.2 grams AFT-425A |
| Foam stabilizer | 0.8 grams AFT-425B | 0.8 grams AFT-425B | 0.8 grams AFT-425B |
| PVA fiber | 1.0 gram (dpf = 1.8) | 1.0 gram (dpf = 15) | 0 |
| Cementitious slurry: | | | |
| calcined gypsum | 60 grams | 60 grams | 60 grams |
| Portland cement Type I | 30 grams | 30 grams | 30 grams |
| metakaolin | 10 grams | 10 grams | 10 grams |
| Lomar D water reducer | 1 gram | 1 gram | 1 gram |
| Water | 40 grams | 40 grams | 40 grams |
| Accelerated Aging Condition: (cubes sealed in bags at 60° C./1 day, dried/1 day, water submerge at 60° C./1 day, then dried at 60° C./1 day) | | | |
| Crack formation | crack free | hairline cracks | extensive & large cracks |
| Crack width | none | 10-15µ (on surface only) | 15-40µ (through cracks over the whole cube) |

A foamed and fiber scrim laminated backer board made from a fast setting gypsum rich cement, pozzolanic additive and lime mixes of the present invention (Sample 1 in Table 7) shows that such crack free and fast setting gypsum rich cement mixes may outperform that of commercial cement backer boards such as Wonderboard from Custom Building Products (Sample 2 in Table 7) in lightness, strength, water resistance, surface and core finish. The ½" thick backer board (Sample 1) shows a bending strength of 1,200 psi at a density of 45 pcf, while the comparative Sample 2 backer board shows a bending strength of 1,100 psi at twice the density (91 pcf).

TABLE 7

Performance of Backerboard made from Calcined gypsum, Portland cement, metakaolin and lime mixes with PVA Fiber and Foam

|  | Sample 1 | Wonderboard Backerboard[a] (comparative) |
|---|---|---|
| Fiber containing Preformed Foam: |  |  |
| Water | 100 grams | not available |
| Foam agent | 5.0 grams AFT-425A |  |
| Foam stabilizer | 3.5 grams AFT-425B |  |
| 2 dpf PVA fiber | 1.5 grams |  |
| Cementitious slurry added to the fiber foam mix above: |  |  |
| calcined gypsum | 50 grams | not available |
| Portland cement Type I | 28 grams |  |
| metakaolin | 12 grams |  |
| lime | 2 grams |  |
| Lomar D water reducer From Diamond Shamrock | 1 gram |  |
| Water | 40 grams |  |
| Fiber Scrim Covered ½" Backerboard: |  |  |
| Density | 45 pcf | 91 pcf |
| Bending Strength | 1,200 psi | 1,100 psi |
| Water Resistance | water resistant | water flows through |
| Surface and core texture | void free & smooth | porous & coarse |

[a]Wonderboard is a ½" thick and fiberglass scrim covered backer board product from Custom Building Products.

In making gypsum rich cement/pozzolanic aggregate mixes, U.S. Pat. No. 6,197,107 stated that the metakaolin/cement ratio of a gypsum rich cement composition has to be greater than 0.30 in order to avoid ettringite caused product disintegration and expansion after hardening. Comparative Sample 2 (in Table 8) made with metakaolin/cement ratio=0.15 did show severe cube crack and product disintegration in consistency with the result shown in the reference (Composition 2 of Table I in U.S. Pat. No. 6,197,107). However, the present invention surprisingly discovered that the use of 1.8 dpf PVA fibers-containing foam of the present invention in such low pozzolanic additive mixes still can prevent product disintegration after cure (Sample 1 in Table 8), even the metakaolin/cement ratio was only 0.15. The cured Sample 1 in Table 8 also showed an excellent compressive strength of 568 psi at a density of 44 pcf, far better than any foamed cement and foamed gypsum at that density. The wet strength also was very good at 280 psi after 55° C. water immersion for 2 days and tested wet. Such performances were unexpected given the findings by prior arts.

TABLE 8

Crack Prevention of Gypsum Rich Cement at <0.30 Metakaolin/cement Ratio Using Foams with 1.8 dpf PVA Fibers

|  | Sample 1 | Sample 2 (comparative) |
|---|---|---|
| Fiber containing Preformed Foam: |  |  |
| Water | 30 grams | 30 grams |
| Foam agent | 1.8 grams AFT-425A | 1.8 grams AFT-425A |
| Foam stabilizer | 1.2 grams AFT-425B | 1.2 grams AFT-425B |
| 1.8 dpf PVA fiber | 1.0 grams | 0 |
| Cementitious slurry: |  |  |
| Calcined gypsum | 47 grams | 47 grams |
| Portland cement Type I | 46 grams | 46 grams |
| Metakaolin | 7 grams | 7 grams |
| Lomar D water reducer | 1 gram | 1 gram |
| Water | 40 grams | 40 grams |
| The ratio of metakaolin/cement | 0.15 | 0.15 |
| Compressive Strength: |  |  |
| After sealed moisture cure at 45° C./ 2 days And drying at 60° C./1 day | 568 psi (no crack) | Cube cracked |
| After cube submerged in 55° C. water/2 days and test wet | 280 psi (no crack) | Cube cracked |

The invention claimed is:

1. A stable aqueous foam carrier comprising:
(1) a stable aqueous foam comprising a foam agent and a foam stabilizer, wherein the stable aqueous foam carrier is configured to remain for 0.1-1 hour without any of liquid drainage, associated foam coarsening associated with liquid drainage, and bubble collapse in order to allow the foam carrier to be thoroughly incorporated into a hydraulic slurry; and
(2) additives comprising fibers, wherein the fibers are uniformly dispersed in the stable aqueous form carrier, wherein the stable aqueous foam carrier does not contain any of gypsum, cement, concrete, fine pozzolanic additives, and aggregates, and wherein the fibers are mixed with the stable aqueous foam at a mixing speed from 50 to 500 rpm such that the shear from the mixing does not break foams in the stable aqueous foam.

2. The stable aqueous foam carrier of claim 1, wherein the stable aqueous foam carrier is used for a hydraulically settable composition, a cementitious article, or a gypsum article.

3. The stable aqueous foam carrier of claim 1, the additives further comprising lightweight fillers, cement or gypsum accelerators, retarders, water proofing additives, water reducing plasticizers, superplasticizers, polymers, colorant, organic and fine inorganic fillers, thickeners or rheology modifiers, or a combination thereof.

4. The stable aqueous foam carrier of claim 1,
wherein the foam agent is a long-chain organic cation-forming compound having Formula (I):

(I)

wherein R is an aliphatic hydrocarbon radical having 8 to 24 carbon atoms; $R_1$ is selected form the group consisting of an alkyl group having 1-16 carbon atoms, a hydroxyalkyl group having 1-16 carbon atoms, a benzyl group, a group which, when taken together with the nitrogen, represents a heterocyclic radical, and any of such groups having a hydrogen atom replaced by a fluorine atom; $R_2$ and $R_3$ are selected form the group consisting of an alkyl group having 1-6 carbon atoms, a hydroxyalkyl group having 1-6 carbon atoms, a benzyl group, a hydrogen atom, a group which, when taken together with the nitrogen, represents a heterocyclic radical, and any of such groups having a hydrogen atom replaced by a fluorine atom; and X– is an anionic counter ion, wherein the foam stabilizer is a long-chain anion forming compound having Formula (II):

$$R'\text{—}X_2^-Y^+ \qquad (II)$$

wherein R' is an aliphatic hydrocarbon radical with 10 to 24 carbon atoms; $X_2-$ is an anionic group selected from the group consisting of carboxylate, sulfate, sulfonate, and phosphate; and $Y^+$ is a cationic counter ion selected from the group consisting of ammonium, sodium, and potassium salt, and wherein the foam agent and the foaming stabilizer are present in a weight ratio of from 0.05:1 to 15:1.

5. The stable aqueous foam carrier of claim 4, wherein stable aqueous foam is configured to maintain the stability thereof without foam collapse in the event that the additives are added thereto.

6. The stable aqueous foam carrier of claim 4, wherein the fibers are hydrophilic fibers, hydrophobic fibers, or a mixture thereof.

7. The stable aqueous foam carrier of claim 4, wherein the fibers are hydrophilic organic fibers.

8. The stable aqueous foam carrier of claim 4 wherein the fibers are from 0.5 to 50% by weight of the stable aqueous foam.

9. The stable aqueous foam carrier of claim 4, wherein the fibers have dpf values from 0.5 to 250.

10. The stable aqueous foam carrier of claim 4, wherein the fibers have dpf values from 0.5 to 25.

11. The stable aqueous foam carrier of claim 4, wherein the fibers have dpf values from 0.5 to 10.

12. A hydraulically settable composition comprising: (1) the stable aqueous foam carrier of claim 1 and (2) a hydraulic mixture comprising gypsum, cement, concrete, fine pozzolanic additives, aggregates, or a mixture thereof.

13. The hydraulically settable composition of claim 12, wherein the hydraulic mixture comprises gypsum, cement, and fine pozzolanic additives.

14. The hydraulically settable composition of claim 12, wherein the cement is Portland cement Types I V, aluminum cement, slag cement, or fast setting cement.

15. The hydraulically settable composition of claim 12, the hydraulic mixture further comprising calcined gypsum, stucco, alpha-calcium sulfate hemihydrate, beta-calcium sulfate hemihydrate, or a mixture thereof.

16. The hydraulically settable composition of claim 12, wherein the hydraulic mixture comprises fine pozzolanic additives made of metakaolin, silica fume, fly ash, ground furnace slag, or a mixture thereof.

17. The hydraulically settable composition of claim 12, wherein the hydraulic mixture comprises cement, gypsum, and pozzolanic additives with weight percentages of 20-80% of gypsum, 5-50% of cement, and 5-40% of pozzolanic additives, based on the hydraulic mixture.

18. The hydraulically settable composition of claim 12, wherein the hydraulically settable composition is configured to set in minutes for quick demolding, to develop high early and final compressive and tensile strengths, and to have water resistance, lightweight, and good surface finish without crack formation upon long term exposure to humid conditions.

19. A gypsum-rich cement composite comprising: (1) the stable aqueous foam carrier of claim 1 and (2) a hydraulic mixture comprising gypsum, cement, and pozzolanic additives, wherein the gypsum-rich cement composite is suitable for block, wall and floor panel, backer board, siding, roof deck, roof tile, decorative stone, ceiling tile, roof shingle, flooring or floor underlayment, building, patching or repairing material for roads, foundations, or bridges.

* * * * *